| United States Patent [19] | [11] Patent Number: 4,988,470 |
|---|---|
| Demlehner et al. | [45] Date of Patent: Jan. 29, 1991 |

[54] PROCESS FOR PREPARING STRUCTURES OF INORGANIC FIBER MATERIAL CONTAINING SILICONE RESIN

[75] Inventors: Ulrich Demlehner, Kastl; Bernward Beubzer; Matthias Wolfgruber, both of Burghausen, all of Fed. Rep. of Germany

[73] Assignee: Wacker-Chemis GmbH, Munich, Fed. Rep. of Germany

[21] Appl. No.: 350,802

[22] Filed: May 12, 1989

[30] Foreign Application Priority Data

May 20, 1988 [DE] Fed. Rep. of Germany ....... 3817332

[51] Int. Cl.$^5$ ........................... C07F 7/00; B29C 43/18
[52] U.S. Cl. ..................................... 264/137; 264/257; 264/331.13; 556/434
[58] Field of Search ............... 264/134, 135, 136, 137, 264/258, 257, 331.3, 236; 556/434

[56] References Cited

U.S. PATENT DOCUMENTS

| 3,395,071 | 7/1968 | Nitzsche et al. | 162/155 |
|---|---|---|---|
| 4,525,400 | 6/1985 | Suprenant | 556/434 |
| 4,757,106 | 7/1988 | Mayer et al. | 524/262 |

*Primary Examiner*—Jay H. Woo
*Assistant Examiner*—Jeremiah F. Durkin, II

[57] ABSTRACT

Structures of inorganic fibers which may contain inorganic particles, flakes or powders, are prepared by adding aqueous silicone resin emulsions containing curing catalysts and emulsifiers to the fiber material, shaping the treated fiber material, and subsequently curing the silicone resin, in which salts or chelates of trivalent iron are employed as the curing catalysts. Iron (III) acetylacetonate is preferably employed as the curing catalyst. The structures are preferably produced in a continuous process in which the aqueous silicone resin emulsion is sprayed onto the fiber material, then the fiber material is compacted to the desired bulk density and the silicone resin is cured by contacting the compacted fiber material with hot gases. Curing of the silicone resin is preferably carried out at a temperature of from 150° to 300° C. over a period of from 5 to 8 minutes.

18 Claims, No Drawings

PROCESS FOR PREPARING STRUCTURES OF INORGANIC FIBER MATERIAL CONTAINING SILICONE RESIN

The present invention relates to structures of inorganic fiber materials and more particularly to a process for preparing structures by treating inorganic fiber materials with aqueous silicone resin emulsions.

BACKGROUND OF THE INVENTION

A process for preparing structures of asbestos fiber material containing aqueous silicone resin emulsions is described in U.S. Pat. No. 3,395,071 to Nitzsche et al in which fiber material is impregnated with aqueous silicone resin emulsions containing chelates of aluminum or dialkyltin acylates as curing catalysts and non-ionic emulsifiers as dispersing agents. The emulsion is broken and the fiber material is shaped while removing the water and drying the mass and curing the silicone resin. Aqueous silicone resin emulsions and their use as binders for inorganic fibrous substances is also described in U.S. Pat. No. 4,757,106 to Mayer et al.

It is an object of the present invention to provide a process for preparing structures of inorganic fiber material containing silicone resin where curing of the silicone resin is carried out in a considerably shorter period of time. Another object of the present invention is to provide a process which can be carried out continuously with conveyor belt lines generally used in preparing sheet-like structures of inorganic fiber material and binder and a higher throughput of structures of inorganic fiber material based on silicone resin than previously obtained. A further object of the present invention is to provide a binder for inorganic fiberous substances which has a high heat stability.

SUMMARY OF THE INVENTION

The foregoing objects and others which will become apparent from the following description are accomplished in accordance with this invention, generally speaking, by providing a process for preparing structures of inorganic fibers, which can be optionally mixed with inorganic particles, flakes or powders, which comprises impregnating fiber material with aqueous silicone resin emulsions containing salts or chelates of trivalent iron as curing catalysts and emulsifiers, shaping the fiber material and curing the silicone resin.

DESCRIPTION OF THE INVENTION

Silicone resins which are preferably used in the process of this invention are those of the formula

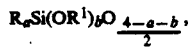

where R is the same or different and represents a methyl or phenyl radical, $R^1$ is the same or different and represents a methyl or ethyl radical, a is 0, 1, 2 or 3, with an average of from 0.8 to 1.5, preferably from 0.9 to 1.1 and more preferably from 0.98 to 1.02, and b is 0, 1, 2 or 3, with an average of from 0.05 to 0.4 preferably from 0.3 to 0.4 and more preferably from 0.33 to 0.37. The silicone resins preferably have a viscosity of at least 2000 mPa.s at 25° C.

The silicone resin used in the process of this invention can be a single type of silicone resin, or it can be a mixture of at least two different types of such silicone resins.

Silicone resins which are preferably employed in the process of this invention are those which are prepared by reacting a low-viscosity organopolysiloxane of the formula

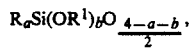

having a viscosity of 10 to 40 mPa.s at 25° C., in which R and $R^1$ are the same as above, a is 0, 1, 2 or 3, with an average of from 0.9 to 1.1, and b is 0, 1, 2 or 3, with an average of from 0.7 to 0.9, with 60 to 65 percent by weight of ethanol and 4 to 6 percent by weight of water in the presence of from 0.17 to 0.20 percent by weight of hydrogen chloride, based on the total weight of the particular silicone resin, while heating, and subsequently removing the volatile constituents by distillation at 130° to 150° C. under 25 to 30 hPa (absolute). The resultant silicone resin which is low in alkoxy groups and has a relatively high viscosity can be used, together with an emulsifier and water, to prepare a stable silicone resin emulsion by known emulsification processes.

The low-viscosity organopolysiloxane which is preferably employed here is an organopolysiloxane of the formula $$CH_3Si(OC_2H_5)_{0.8}O_{1.1}$$

having a viscosity of 20 mPa.s at 25° C. The preparation of such organopolysiloxanes is known in the art. They are obtained, for example, by reacting methyltrichlorosilane with ethanol and water.

The aqueous silicone resin emulsions employed in the process of this invention preferably contain silicone resin in an amount of from 10 to 70 percent by weight, preferably from 40 to 60 percent by weight and more preferably from 45 to 55 percent by weight, based on the total weight of the particular emulsion.

All the emulsifiers known heretofore which have been or could have been used to prepare stable aqueous silicone resin emulsions of silicone resins of the type described above can be used as emulsifiers in the process of this invention. Cationic, anionic or non-ionic emulsifiers are preferably employed. The emulsifiers such as described in U.S. Pat. No. 4,757,106 mentioned heretofore can also be employed. Non-ionic emulsifiers are preferably employed. Emulsifiers based on polyethylene glycol, such as isotridecyl alcohol polyethylene oxide ethers having an average of 16 ethylene oxide units, polyvinyl alcohol derivatives and polyvinyl acetate which has been saponified to the extent of 80 to 95 percent are preferably employed.

The aqueous silicone resin emulsions employed in the process of this invention contain the emulsifier in an amount of from 0.1 to 20 percent by weight, preferably from 1 to 10 percent by weight and more preferably from 2 to 4 percent by weight, based on the total weight of the particular emulsion.

The aqueous silicone resin emulsions employed in the process of this invention are preferably prepared by first mixing the silicone resin with the emulsifier and then emulsifying the resulting mixture in water. Both the mixing operation and the emulsification can be carried out in customary mixing units which are suitable for the preparation of emulsions, such as high-speed stator-rotor stirring units, such as are known under the registered trademark "UltraTurrax", or pressure emulsifying machines or colloid mills.

Catalysts which are employed in the process of this invention are salts of trivalent iron, such as preferably, iron(III) chloride, or chelates of trivalent iron, such as preferably iron(III) stearate or iron(III)-(2-ethylhexanoate). Iron(III) acetylacetone is preferably employed as the curing catalyst. If appropriate, chelates of trivalent iron are dissolved with a water-insoluble solvent, such as toluene or xylene. These curing catalysts can be added to the silicone resin in various ways. The curing catalyst or a solution of the curing catalyst is emulsified together with the silicone resin, or the curing catalyst or a solution of the curing catalyst is emulsified with one of the emulsifiers mentioned above and this emulsion is added to the aqueous silicone resin emulsion or to a dilution of the original silicone resin emulsion, or the curing catalyst or a solution of the curing catalyst is dispersed in the aqueous silicone resin emulsion or in a dilution of the original silicone resin emulsion. The mixing of the curing catalyst with the silicone resin can be carried out in a stock container or in a corresponding delivery line. The aqueous silicone resin emulsion or a dilution of the original silicone resin emulsion and the curing catalyst or a solution of the curing catalyst can moreover be applied to the inorganic fiber material separately from one another, as long as adequate mixing on the fiber is ensured.

The curing catalyst is employed in the process of this invention in an amount of from 0.1 to 20 percent by weight, preferably from 0.5 to 4 percent by weight and more preferably from 1 to 3 percent by weight, based on the total weight of the particular silicone resin.

In the process of this invention, the inorganic fiber material can be impregnated with silicone resin emulsion by adding the fiber material to the silicone resin emulsion, the emulsion being broken. Further processing can be carried out in accordance with the procedure described in U.S. Pat. No. 3,395,071, for example, shaping while removing water, drying the mass and curing the silicone resin. Preferably, the process of this invention is carried out continuously using the conveyor belt lines customarily used for the production of sheet-like structures of inorganic fiber material and binder, such as are described, for example, in Ullmanns Encyklopadie der technischen Chemie (Ullmann's Encyclopaedia of Industrial Chemistry), 4th edition, Volume 11, page 370, where the silicone resin emulsions employed in the process of this invention are used as the binder instead of the customary phenol/formaldehyde resins. The silicone resin emulsion is in this way sprayed on the inorganic fiber material by means of a metering system after leaving the melting furnace. The fiber material prepared in this way is further processed on the conveyor belt lines in the customary manner, in that it is compacted to the desired bulk density in a drying oven and the silicone resin is cured by blowing through hot gases. Curing of the silicone resin is preferably carried out by blowing through hot gases at a temperature of from 150° to 300° C. over a period of 5 to 8 minutes. The higher the gas temperature, the shorter the time required for curing.

Before application to the inorganic fibers, the silicone resin emulsion can be diluted with water. The dilution and the rate at which the silicone resin emulsions are sprayed on the inorganic fibers are adjusted so that the inorganic fibers treated with the silicone resin emulsion have a silicone resin content of preferably from 1 to 20 percent by weight, preferably from 3 to 10 percent by weight and more preferably from 5 to 8 percent by weight, based on the total weight of the inorganic fibers, after passing through the drying oven.

Inorganic fibers, such as glass wool, rock wool, asbestos fibers, quartz fibers or glass fibers, by themselves or as a mixture with at least two different inorganic fibers or as a mixture with inorganic particles, flakes or powders, can be processed to form sheet-like structures or other shaped articles by the process of this invention.

The products produced by the process of this invention can be used, in particular, where they must withstand high temperatures, attack by chemicals or high humidity. They can furthermore advantageously be employed where no emission of gases from the product is desired.

In the following examples, all parts and percentages are by weight, unless otherwise specified.

EXAMPLE 1

(a) About 180 kg of commercially available monomethylsiloxane having the empirical formula $$CH_3Si(OC_2H_5)_{0.8}O_{1.1}$$

and having a viscosity of 20 mPa.s at 25° C. (commercially available under the tradename "Trasil" from Wacker-Chemie GmbH) are heated to the boiling point together with 110 kg of ethanol and 9 kg of aqueous 1N HCl. After a reaction time of one hour, the highly volatile constituents are distilled off at 85° C. under 1020 hPa (absolute) and the less volatile constituents are distilled off at 135° C. under 26.7 hPa (absolute). A monomethylsilicone resin containing 36 mol percent of ethoxy groups and having a viscosity of 20,000 mPa.s at 25° C. is obtained.

(b) About 250 kg of the monomethylsilicone resin prepared in (a) above are mixed with 15 kg of a nonionic emulsifier based on polyethylene glycol and available under the tradename "Arlypon IT 16" from Grünau (isotridecyl alcohol polyethylene oxide ether containing an average of 16 polyethylene oxide units). The silicone resin is then emulsified using an emulsifying unit, such as, for example, an "UltraTurrax", with 235 kg of water with continuous stirring An aqueous silicone resin emulsion having a silicone resin content of 50 percent by weight, based on the total weight of the silicone resin emulsion, is obtained.

(c) About 40 kg of the aqueous silicone resin emulsion thus obtained are diluted with 160 kg of water. Shortly before use, 4 kg of a 10 percent solution of iron(III) acetylacetonate in toluene are dispersed in this dilute aqueous silicone resin emulsion by rapid stirring. This mixture is sprayed at a rate of 1000 liters per hour by means of a metering system onto rock wool fibers after the rock wool fibers have left the melting furnace, so that about 6 percent by weight of silicone resin, based on the total weight of the rock wool fibers, is deposited on the fibers. Rock wool mats are then produced from the wetted rock wool fibers in a continuous process in which the wetted rock wool fibers are run on a conveyor belt with a shaping device through a drying oven, where they are heated up to an average temperature of about 120° C. by blowing hot gases through at 250° C. for 8 minutes to cure the silicone resin. After leaving the drying oven, the rock wool fibers show good bonding to one another in the rock wool mats thus obtained.

Test specimens having dimensions of 15 cm x 15 cm x 7 cm are taken from the rock wool mats and examined for curing. To test for curing, the water uptake of the test specimens is investigated. The lower the water uptake the better the curing. The water uptake is determined by placing the test specimens in water 2 cm below the surface of the water for 24 hours and are then placed diagonally over a grid and left to drip for 15 minutes. A water uptake of 10 percent is then measured. If the test specimens are heated at 300° C. for 15 hours, this water uptake is reduced further, which means a further improvement in the curing. After the test specimens have been heated at 600° C. for 2 hours, the cohesion of the fibers is still good and the test specimens still have good dimensional stability.

In contrast, the water uptake of rock wool mats with phenolic resin binder is increased 20 to 100 fold after heating at 300° C. for 15 hours. This indicates extensive degradation of the binder. After heating at 600° C. for 2 hours, the fibers in the rock wool mats containing phenolic resin binder no longer have any cohesion.

COMPARISON EXAMPLE 1

The procedure of Example 1(c) is repeated, except that no curing catalyst is used.

Rock wool mats which do not have adequate curing and hence strength are obtained. The water uptake of the test specimens, which was determined as described in Example 1(c) is about 500 percent.

COMPARISON EXAMPLE 2

The procedure of Example 1(c) is repeated, except that 2.8 kg of a 6 percent solution of KOH in water are substituted for the 4 kg of a 10 percent solution of iron-(III) acetylacetonate in toluene.

Rock wool mats which do not have adequate curing and hence strength are obtained. The water uptake of the test specimens, which was determined as described in Example 1(c), is about 300 percent. Only after the test specimens have been heated at 250° C. for 15 hours is the water uptake of the test specimens 10 percent.

COMPARISON EXAMPLE 3

The procedure of Example 1(c) is repeated, except that 4 kg of a 10 percent solution of aluminum acetylacetonate in toluene, described in U.S. Pat. No. 3,395,071, is substituted for 4 kg of the 10 percent solution of iron-(III) acetylacetonate in toluene.

Rock wool mats which do not have adequate curing and hence strength are obtained. The water uptake of the test specimens, which was determined as described in Example 1(c) is about 300 percent.

COMPARISON EXAMPLE 4

An aqueous silicone resin emulsion described in Example 1 of U.S. Pat. No. 4,757,106 is employed. No curing catalyst is added to the silicone resin emulsion. The process for the preparation of the rock wool mats containing silicone resin binder is then carried out as described in Example 1(c) above. Rock wool mats which do not have adequate curing and hence strength are obtained. The water uptake of the test specimens, which was determined in accordance with Example 1(c) above, is about 300 percent. Only with subsequent heating and compression at 200° C. for 2 hours is the water uptake of the test specimens 10 percent.

What is claimed is:

1. A process for preparing inorganic fiber structures which comprises impregnating inorganic fiber material with an aqueous emulsion comprising a silicone resin having the formula

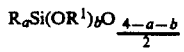

where R is selected from the group consisting of a methyl and phenyl radical, $R^1$ is selected from the group consisting of a methyl and ethyl radical, a is 0, 1, 2 or 3, with an average of from 0.8 to 1.5 and b is 0, 1, 2 or 3, with an average of from 0.05 to 0.4 and a viscosity of at least 2000 mPa.s at 25° C., an emulsifier and a curing catalyst selected from the group consisting of salts of trivalent iron and chelates of trivalent iron, shaping the impregnated fiber material and thereafter curing the silicone resin.

2. The process of claim 1, wherein iron(III) acetylacetonate is used as curing catalyst.

3. The process of claim 1, wherein the aqueous silicone resin emulsion is sprayed on the fiber material, and the fiber material is compacted to the desired bulk density and the silicone resin is cured by contacting the compacted fiber material with hot gases.

4. The process of claim 2, wherein the aqueous silicone resin emulsion is sprayed on the fiber material, and the fiber material is compacted to the desired bulk density and the silicone resin is cured by contacting the compacted fiber material with hot gases.

5. The process of claim 3, wherein the silicone resin is cured by blowing hot gases at a temperature of from 150° to 300° C. over a period of 5 to 8 minutes through the compacted fiber material.

6. The process of claim 4, wherein the silicone resin is cured by blowing hot gases at a temperature of from 150° to 300° C. over a period of 5 to 8 minutes through the compacted fiber material.

7. The process of claim 1, wherein the aqueous silicone resin emulsion is obtained from the reaction of an organopolysiloxane of the formula

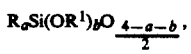

having a viscosity of from 10 to 40 mPa.s at 25° C., in which R represents a methyl or phenyl radical, $R^1$ represents a methyl or ethyl radical, a is 0, 1, 2 or 3, with an average of from 0.9 to 1.1, and b is 0, 1, 2 or 3, with an average of from 0.7 to 0.9, with 60 to 65 percent by weight of ethanol and 4 to 6 percent by weight of water in the presence of 0.17 to 0.20 percent by weight of hydrogen chloride, based on the total weight of the silicone resin, while heating and subsequently removing the volatile constituents by distillation at 130° to 150° C. under 25 to 30 hPa (absolute), mixing the resulting silicone resin with emulsifier with rapid stirring and emulsifying the resulting mixture in water with rapid stirring.

8. The process of claim 2, wherein the aqueous silicone resin emulsion is obtained from the reaction of an organopolysiloxane of the formula

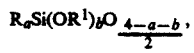

having a viscosity of from 10 to 40 mPa.s at 25° C., in which R represents a methyl or phenyl radical, R¹ represents a methyl or ethyl radical, a is 0, 1, 2 or 3, with an average of from 0.9 to 1.1, and b is 0, 1, 2 or 3, with an average of from 0.7 to 0.9, with 60 to 65 percent by weight of ethanol and 4 to 6 percent by weight of water in the presence of 0.17 to 0.20 percent by weight of hydrogen chloride, based on the total weight of the silicone resin, while heating and subsequently removing the volatile constituents by distillation at 130° to 150° C. under 25 to 30 hPa (absolute), mixing the resulting silicone resin with emulsifier with rapid stirring and emulsifying the resulting mixture in water with rapid stirring.

9. The process of claim 3, wherein the aqueous silicone resin emulsion is obtained from the reaction of an organopolysiloxane of the formula

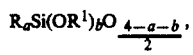

having a viscosity of from 10 to 40 mPa.s at 25° C., in which R represents a methyl or phenyl radical, R¹ represents a methyl or ethyl radical, a is 0, 1, 2 or 3, with an average of from 0.9 to 1.1, and b is 0, 1, 2 or 3, with an average of from 0.7 to 0.9, with 60 to 65 percent by weight of ethanol and 4 to 6 percent by weight of water in the presence of 0.17 to 0.20 percent by weight of hydrogen chloride, based on the total weight of the silicone resin, while heating and subsequently removing the volatile constituents by distillation at 130° to 150° C. under 25 to 30 hPa (absolute), mixing the resulting silicone resin with emulsifier with rapid stirring and emulsifying the resulting mixture in water with rapid stirring.

10. The process of claim 4, wherein the aqueous silicone resin emulsion is obtained from the reaction of an organopolysiloxane of the formula

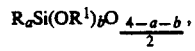

having a viscosity of from 10 to 40 mPa.s at 25° C., in which R represents a methyl or phenyl radical, R¹ represents a methyl or ethyl radical, a is 0, 1, 2 or 3, with an average of from 0.9 to 1.1, and b is 0, 1, 2 or 3, with an average of from 0.7 to 0.9, with 60 to 65 percent by weight of ethanol and 4 to 6 percent by weight of water in the presence of 0.17 to 0.20 percent by weight of hydrogen chloride, based on the total weight of the silicone resin, while heating and subsequently removing the volatile constituents by distillation at 130° to 150° C. under 25 to 30 hPa (absolute), mixing the resulting silicone resin with emulsifier with rapid stirring and emulsifying the resulting mixture in water with rapid stirring.

11. The process of claim 5, wherein the aqueous silicone resin emulsion is obtained from the reaction of an organopolysiloxane of the formula

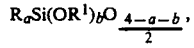

having a viscosity of from 10 to 40 mPa.s at 25° C., in which R represents a methyl or phenyl radical, R¹ represents a methyl or ethyl radical, a is 0, 1, 2 or 3, with an average of from 0.9 to 1.1, and b is 0, 1, 2 or 3, with an average of from 0.7 to 0.9, with 60 to 65 percent by weight of ethanol and 4 to 6 percent by weight of water in the presence of 0.17 to 0.20 percent by weight of hydrogen chloride, based on the total weight of the silicone resin, while heating and subsequently removing the volatile constituents by distillation at 130° to 150° C. under 25 to 30 hPa (absolute), mixing the resulting silicone resin with emulsifier with rapid stirring and emulsifying the resulting mixture in water with rapid 12. The process of claim 7, wherein the organopolysiloxane is represented by the formula

and has a viscosity of 20 mPa.s at 25° C.

13. The process of claim 8, wherein the organopolysiloxane is represented by the formula

and has a viscosity of 20 mPa.s at 25° C.

14. The process of claim 9, wherein the organopolysiloxane is represented by the formula

and has a viscosity of 20 mPa.s at 25° C.

15. The process of claim 10, wherein the organopolysiloxane is represented by the formula

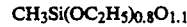

and has a viscosity of 20 mPa.s at 25° C.

16. The process of claim 11, wherein the organopolysiloxane is represented by the formula

and has a viscosity of 20 mPa.s at 25° C.

17. The process of claim 1, wherein the inorganic fibers can be mixed with inorganic particles, flakes or 18. The process of claim 2, wherein the inorganic fibers can be mixed with inorganic particles, flakes or powders.

* * * * *

UNITED STATES PATENT AND TRADEMARK OFFICE
CERTIFICATE OF CORRECTION

PATENT NO. : 4,988,470

DATED : January 29, 1991

INVENTOR(S) : Ulrich Demlehner, Bernward Deubzer and Matthias Wolfgruber

It is certified that error appears in the above-identified patent and that said Letters Patent is hereby corrected as shown below:

On the title page, item (73) "Assignee", after "Wacker-" delete "Chemis" and insert ---Chemie---.

Signed and Sealed this

Twenty-third Day of June, 1992

Attest:

DOUGLAS B. COMER

*Attesting Officer*  *Acting Commissioner of Patents and Trademarks*

UNITED STATES PATENT AND TRADEMARK OFFICE
CERTIFICATE OF CORRECTION

PATENT NO. : 4,988,470
DATED : January 29, 1991
INVENTOR(S) : Ulrich Demlehner, Bernward Deubzer and Matthias Wolfgruber It is certified that error appears in the above-identified patent and that said Letters Patent is hereby corrected as shown below:

Column 1, under "Inventors", after "Bernward" delete "Beubzer" and insert ---Deubzer---.

Signed and Sealed this

Fourth Day of August, 1992

Attest:

DOUGLAS B. COMER

*Attesting Officer*     *Acting Commissioner of Patents and Trademarks*